Figure 1:
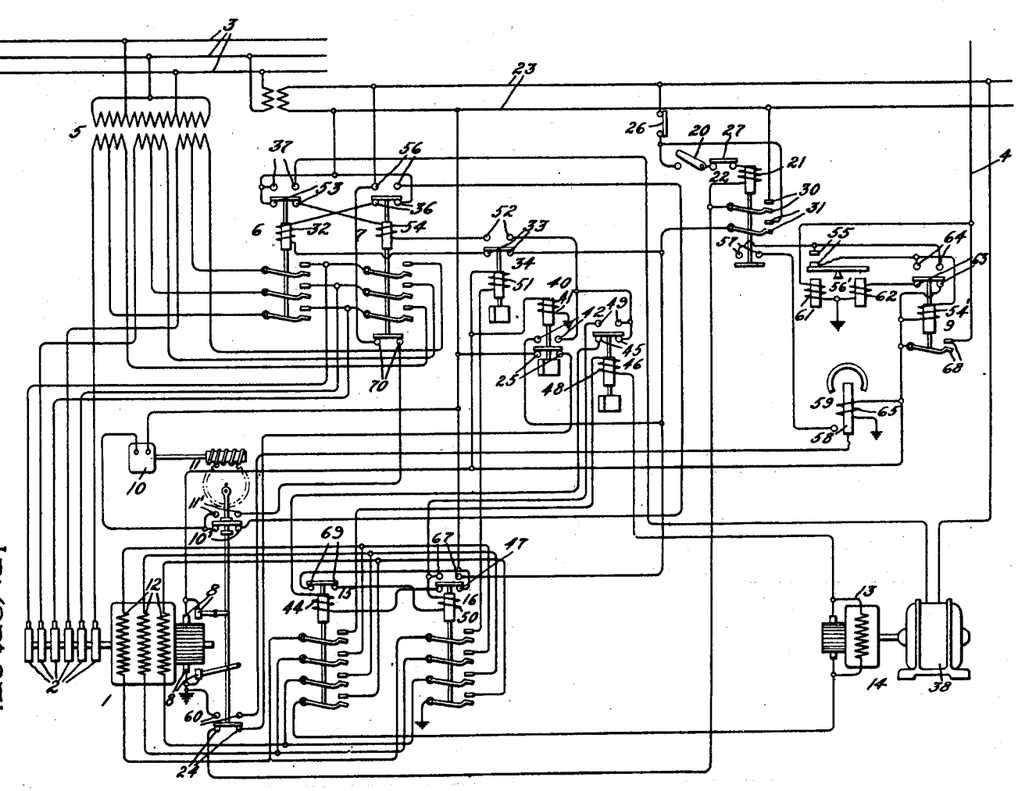

Dec. 13, 1927.

M. A. WHITING 1,652,882

AUTOMATIC CONTROL EQUIPMENT

Original Filed Nov. 17, 1922

Inventor:
Max A. Whiting,
by *Alexander S. Smith*
His Attorney.

Patented Dec. 13, 1927.

1,652,882

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

AUTOMATIC CONTROL EQUIPMENT.

Application filed November 17, 1922, Serial No. 601,602. Renewed September 24, 1926.

My invention relates to automatic control equipments for dynamo electric machines and particularly to such equipments for synchronous converters.

One object of my invention is to provide a simple and improved control equipment of the type above referred to, in which a plurality of electromagnetically actuated devices are interconnected and operated automatically in the proper sequence under all conditions, to control the operation of a synchronous converter.

Another object of my invention is to provide in an automatic control equipment of the type referred to, an improved arrangement for insuring that the synchronous converter has reached a predetermined speed before the field winding of the converter is supplied with direct current to pull the converter into step with a predetermined polarity.

Another object of my invention is to provide in an automatic control equipment of the type referred to, an improved arrangement for insuring that the converter has a predetermined polarity before it is self-excited.

Another object of my invention is to provide in an equipment of the type referred to a new and improved arrangement for preventing the equipment from operating to effect the restarting of the converter in an improper manner.

According to my invention I provide an improved arrangement for a synchronous converter whereby the converter is started by a low voltage being impressed upon its armature winding and with its field unexcited; after the converter has reached synchronous speed, the field winding is energized from a separate source of direct current to pull the converter into step with a predetermined polarity; after the converter has been pulled into step with this predetermined polarity, the field winding is disconnected from the separate source and is connected to the direct current brushes of the converter; and after the shunt field current has built up to a predetermined value, a high voltage is impressed upon the armature winding of the converter and the direct current brushes are connected to a direct current distribution circuit.

My invention will be better understood from the following description, taken in connection with the accompanying drawing, and its scope will be pointed out in the appended claims.

Referring to the drawing which shows one embodiment of my invention, 1 is a synchronous converter the collector rings 2 of which are arranged to be connected to any suitable source of alternating current such as an alternating current supply circuit 3. The converter is arranged to supply direct current to a direct current distribution circuit 4 one side of which is shown as ground. A transformer 5 is interposed between the supply circuit 3 and the collector rings 2 of the synchronous converter and is provided with suitable taps on its secondary winding so that a low voltage may be impressed upon the collector rings when the converter is being started and a higher voltage may be impressed upon the collector rings after the converter has been started. The contactor 6 is arranged to establish the connection between the low voltage taps of the transformer 5 and the collector rings 2 and the contactor 7 is arranged to establish the connection between the high voltage taps of the transformer 5 and the collector rings 2. Any other suitable switching means, however, may be used to impress a low voltage and a high voltage on the collector rings of the converter.

The direct current brushes 8 of the converter are connected to the direct current distribution circuit 4 by a contactor 9 which is arranged to connect the ungrounded brushes of the converter to the ungrounded side of the distribution circuit. It is to be understood, however, that my invention is not limited to a grounded system. The grounded brushes are shown as being connected directly to ground. Any other suitable means however, may be used for controlling the connection between the converter and the distribution circuit.

The converter may be provided with any suitable means for raising the brushes from the commutator so that they may be maintained in the raised position while the converter is being started. In the particular brush lifting mechanism diagrammatically shown in the drawing, all but two of the brushes 8 are pivotally mounted. The pivotally mounted brushes are arranged to be raised and lowered by a motor 10, a worm and worm gear 11 and a crank operated by the worm gear. The pivoted and stationary brushes of corresponding polarity are, however, electrically connected together. When the worm and worm gear 11 are in the position shown, the pivoted brushes 8 are raised. When the worm gear has been rotated 180 degrees from the position shown, the pivoted brushes are in engagement with the commutator. Suitable limit switches 10' and 11' are provided so that the circuit of the motor 10 is automatically opened when the brush raising and lowering operations are completed. As shown, the contacts 10' are closed when the brush raising operation is completed and remain closed until the brush lowering operation is completed. The contacts 11' are closed when the brush lowering operation is completed and remain closed until the brush raising operation is completed.

The synchronous converter is provided with a field winding 12 which is arranged to be connected to any suitable source of direct current such as the generator 13 of the motor generator set 14 by means of a contactor 15. The field winding 12 is also arranged to be connected across the direct current brushes of the converter by means of the contactor 16. Preferably the field winding 12 is arranged to be divided into several sections when both of the contactors 15 and 16 are open so that when the converter is being started, the voltage stresses in the field winding are reduced to a safe value.

In order to start and stop the synchronous converter under normal conditions, a hand switch 20 is provided which, when closed, initiates the starting of the converter and, when opened, initiates the stopping of the converter. It is to be understood, however, that any other well known means, which may be either automatically or manually actuated may be used to initiate the starting and the stopping of the converter. As shown in the drawing, the closing of the switch 20 connects the coil 21 of the master relay 22 across the control circuit 23 which may be supplied from any suitable source of current such as the supply circuit 3. The energizing circuit of the coil 21 also includes the contacts 24 on the brush raising mechanism, which are closed only when the pivoted brushes 8 are out of engagement with the commutator of the converter. Therefore it is apparent that the converter can only be started when the pivoted direct current brushes of the converter are out of engagement with the commutator. The circuit of the coil 21 also includes the contacts 25 of the relay 40 and the contacts of the protective devices which are usually provided with automatic control equipments so that the master relay 22 cannot operate to effect the starting of the synchronous converter unless these relays indicate that the apparatus is in an operative condition. In order to simplify the drawing, these protective devices have been omitted, since they do not constitute a part of the present invention. Contacts 26 and 27, however, are shown to indicate where the contacts of these protective devices may be connected. A protective device which can be built to handle a large current may be connected as indicated by the contact 26. A protective device not capable of handling as great a current may be connected as indicated by the contact 27.

After the coil 21 of the master relay 22 has been energized, the opening of the contacts 24 of the brush raising mechanism or the opening of the contacts 25 of the relay 40 does not deenergize the coil 21 because the contacts 30 of the master relay which are closed when the coil 21 is energized, completes a shunt circuit around the contacts 24 and 25. The master relay 22 is also provided with the contacts 31 which are closed when the coil 21 is energized. The closing of the contacts 31 connects the coil 32 of the contactor 6 across the control circuit 23 so that collector rings 2 of the converter are connected to the low voltage taps of the transformer to start the converter. The circuit of the coil 32 also includes the contacts 26, the contacts 33 of the relay 34 and the contacts 36 on the contactor 7 which are closed when the contactor is open. Therefore the contactor 6 can be closed only when the master relay 22 is closed, contactor 7 is open and the relay 34 is in its normal position.

The contactor 6 is also provided with the auxiliary contacts 37 which are closed when the coil 32 is energized. The closing of these contacts connects the motor 38 of the motor generator set 14 across the control circuit 23 so that the generator 13 is available to supply direct current to the field winding 12 of the converter to pull it into step with the right polarity after the converter has reached a predetermined speed. However any other suitable source of direct current may be used in place of generator 13, such as a storage battery or a rectifier. The relay 40, the winding 41 of which is connected across the two stationary brushes 8 of the converter, is arranged to effect the connection of the field winding 12 of the converter to the generator 13 when the converter reaches a predetermined speed. The relay 40 is designed so that it operates only in response to current of a very low frequency and preferably only in response to a predetermined value of direct current. As long as the speed of the converter is below synchronous speed, alternating current flows through the coil 41 of the relay 40 so that the relay remains inoperative. When, however, the converter reaches synchronous speed so that only direct current flows through the coil 41, the relay operates to open its contacts 25 and close its contacts 42. The relay 40 is preferably of the type known in the art as a hesitating control relay and particularly of the type which is inductively damped so that it has a considerable "hesitating" characteristic. That is to say, when the coil 41 is deenergized, the relay does not open its contacts 42 until some time later, typically one second or more. This feature prevents the relay from opening its contacts 42 when the voltage across the brushes on the commutator passes through zero in case the converter slips a pole when the field winding 12 is separately excited or when any other sudden change occurs in the phase position of the converter armature. Another function of the relay 40 is to prevent the immediate reclosing of the master relay 22 after it has opened due to any cause so that all of the control devices have time to return to their normal positions before the master relay can be again energized to effect the restarting of the converter. In this way it is insured that the starting sequence of operation is correct under all conditions.

The closing of the contacts 42 connects the coil 44 of the contactor 15 across the control circuit 23, so that the contactor 15 operates to connect the field winding 12 to the generator 13. The circuit of the coil 44 also includes the contacts 26, contacts 31 of the master relay 22, contacts 45 of the relay 46 and auxiliary contacts 47 on the contactor 16 which are closed when the contactor is open. Therefore the contactor 15 can be closed only when the contactor 16 is open. The coil 48 of the relay 46 is connected in series with the field winding 12 and the generator 13.

It may often occur that the excitation from generator 13 is applied to the converter field while the converter has the wrong polarity. Under this condition the converter, as is well known, slips a pole and then locks into step with the correct polarity. It has been found that when this occurs, the separately excited field current from the source 13 is so affected by the induced voltage in the converter field during the slipping that this field current does not attain and maintain its maximum value until the converter has thus slipped and has locked into step at the correct polarity. Preferably the relay 46 is also of the hesitating control type, inductively damped, and is designed so that it does not open its contacts 45 and close its contacts 49 until the field current supplied by the generator 13 builds up to a predetermined steady value thereby indicating that the converter is in step with the correct polarity. When the relay 46 opens its contacts 45 and closes its contacts 49, the coil 44 of the contactor 15 is deenergized so that the field winding 12 is disconnected from the generator 13 and the coil 50 of the contactor 16 is connected across the control circuit 23 so that the field winding 12 is connected across the direct current brushes 8 of the converter. The circuit of the coil 50 also includes the contacts 26, the contacts 31 of the master relay, contacts 42 of the relay 41 and the auxiliary contacts 69 on the contactor 15 which are closed when the contactor 15 is open. The closing of the auxiliary contacts 67 on the contactor 16 when the coil 50 is energized, completes a shunt circuit around the contacts 49 so that the contactor 16 remains closed after the relay 46 opens its contacts 49 due to the circuit of the coil 48 being opened by the opening of the contact 15. The "hesitating" characteristic however of the relay 46 keeps the contacts 49 closed long enough to allow the contactor 16 to close and complete its locking circuit through contacts 67.

The coil 51 of the relay 34 is connected in series with the field winding 12 of the converter when the contactor 16 is closed to establish self-excitation of the converter. Preferably, the relay 34 is designed so that it operates only in response to a predetermined value of direct current. After the contactor 16 closes and the direct current through the field winding 12 builds up to a predetermined value, the relay 34 operates to open its contacts 33 and close its contacts 52. The opening of the contacts 33 deenergizes the coil 32 of the contactor 6 so that the collector rings 2 are disconnected from the low voltage taps of the transformer 5. The opening of the auxiliary contacts 37 of the contactor 6 disconnects the motor 38 from the control circuit 23 so that the motor generator set 14 shuts down. As soon as the contactor 6 opens and closes its auxiliary contact 53, the coil 54 of the contactor 7 is connected across the control circuit 23. The circuit of the coil 54 also includes the contacts 26, contacts 31 of the master relay 22, contacts 42 of the relay 40 and the contacts 52 of the relay 34. Since the circuit of the coil 54 includes the contacts 53 on the contactor 6, the contactor 7 can only be closed when the contactor 6 is open. The closing of the contactor 7 connects the collector rings 2 of the converter to the high voltage taps of the transformer 5.

It is well known that when the alternating current connection of a synchronous machine is changed from a low voltage to a high voltage source a transient disturbance is produced in the field current. It has been found that the field current may thus reduce to zero for a short period of time. Therefore it is preferable to make the relay 34 of the hesitating type so that it will keep its contacts 52 closed during such sudden changes in the field current.

The contactor 7 is also provided with the auxiliary contacts 56 which are closed when the coil 54 is energized. The closing of the contacts 56 connects the motor 10 of the brush raising mechanism across the control circuit 23 so that the movable brushes 8 are moved into engagement with the commutator. The circuit of the motor 10 also includes the limit switch 10' on the brush raising mechanism so that the circuit of the motor is maintained until the brushes are in engagement with the commutator.

The circuit of the coil 54' of the contactor 9 which controls the connection between the converter and the distribution circuit 4, is arranged to be connected across the brushes 8 of the converter after the pivoted brushes 8 are moved into engagement with the commutator. The circuit of the coil 54' includes the contacts 55 of the direct current voltage equalizing relay 56', the contacts 57 of the master relay 22, the contacts 58 of the polarized relay 59 and the contacts 60 of the brush raising mechanism.

The direct current voltage equalizing relay 56' is a differential relay comprising two coils 61 and 62. The coil 61 is connected across the load circuit 4 and the coil 62 is connected across the direct current brushes 8 of the converter by means of the contacts 63 of the contactor 9, which are closed when the coil 54 of the contactor is not energized. The coils 61 and 62 are so arranged that the relay 56' closes its contacts 55 when the direct current voltage of the converter exceeds the voltage of the distribution circuit 4 by a predetermined amount. In order to maintain the coil 54 of the contactor 9 energized after the contactor opens its contacts 63, the contactor is provided with the contacts 64 which complete a shunt circuit around its contacts 55 when the coil 54 is energized.

The contacts 57 of the master relay 22 are closed when the coil 21 is energized.

The polarized relay 59 is provided with a coil 65 which is connected across the terminals of the generator 3. The relay is so designed that it closes its contacts 58 only when the direct current voltage of the converter is a predetermined value and in a predetermined direction. This relay prevents the coil 54 from being energized in case the polarity of the converter is wrong, due to the failure of some of the other devices operating in the proper manner.

The contacts 60 of the brush raising mechanism are closed when the movable brushes are in engagement with the commutator of the converter. It is usually desirable to introduce a time delay between the closing of the contactor 7 and the closing of the contactor 9. With the arrangement shown the necessary time delay is obtained by means of the brush raising mechanism which takes several seconds to complete its brush lowering operation.

It is therefore evident that the converter can be connected to the distribution circuit 4 only when the master relay 22 is energized, the voltage of the converter is correct and the movable brushes of the converter are in engagement with the commutator.

The converter may be provided with any suitable means for protecting it against short circuits and overloads on the distribution circuit. Such means are not shown in the drawing, however, because they are well known in the art and do not constitute a part of my invention.

The operation of the equipment shown in the drawing is as follows:

When the converter is shut down and all of the apparatus is in operative condition, the different control devices occupy the positions shown in the drawing. In order to start the converter, the switch 20 is closed. The closing of the switch 20 completes the circuit of the coil 21 of the master relay 22. The closing of the contacts 31 of the master relay completes the circuit of the coil 32 of the contactor 6 so that a low voltage is impressed on the collector rings 2 of the converter to start the converter, and the motor 38 of the motor generator set 14 is connected across the control circuit 23. When the converter reaches synchronous speed or a speed at which the slip of the converter does not exceed a predetermined small value, the relay 40 operates to close its contacts 42. The closing of the contacts 42 completes the circuit of the coil 44 of the contactor 15 so that the field winding 12 of the converter is connected to the generator 13 to pull the converter into step with the right polarity. As soon as the converter thus pulls into step and the field current builds up to a predetermined steady value, the relay 46 opens its contacts 45 and closes its contacts 49. The opening of the contacts 45 deenergizes the coil 44 of the contactor 15 so that the field winding 12 is disconnected from the generator 13. The closing of the contacts 49 of the relay 46 completes the circuit of the coil 50 of the contactor 16 so that the field winding 12 of the converter is connected across the direct current brushes 8 of the converter. Although the circuit of the winding 48 of the relay 46 is opened when the contactor 15 opens, the relay 46 maintains the contacts 49 closed for a sufficient length of time to allow the contactor 16 to close. The closing of the auxiliary contacts 67 on the contactor 16 completes a circuit for the coil 50 which is independent of the contacts 49 of the relay 46 so that the contactor 16 remains closed after the relay 46 opens its contacts 49. As soon as the shunt field current builds up to a predetermined value, the relay 34 opens its contacts 33 and closes its contacts 52. The opening of the contacts 33 deenergizes the coil 32 of the contactor 6 so that the collector rings 2 are disconnected from the low voltage taps of the transformer. As soon as the contacts 53 of the contactor 6 are closed the coil 54 of the contactor 7 is energized so that the collector rings 2 of the converter are connected to the high voltage taps of the transformer. The opening of contacts 37 when the coil 32 is deenergized, disconnects the motor 38 of the motor generator set 14 from the control circuit 23, so that the motor generator set shuts down.

The closing of the contacts 56 of the contactor 7 when the coil 54 is energized, completes the circuit of the motor 10 of the brush raising mechanism so that the movable brushes 8 are moved into engagement with the commutator of the converter. When the brush lowering operation is completed the limit switch 10' opens and the limit switch 11' closes. The opening of the limit switch 10' opens the circuit of the motor 10.

As soon as the direct current voltage of the converter exceeds the voltage across the distribution circuit 4 by a certain amount, the direct current voltage equalizing relay 56' closes its contacts 55. If the polarity of the converter is correct, the polarized relay 59 closes its contacts as soon as the direct current voltage of the converter exceeds a predetermined value. Therefore, if the direct current voltage of the converter is above a predetermined value and of the right polarity when the contacts 60 of the brush raising mechanism are closed, the circuit of the coil 54' of the contactor 9 is completed. The closing of the main contacts 68 of the contactor when the coil 54' is energized, connects the ungrounded brushes of the converter to the ungrounded side of the distribution circuit 4. The closing of the contacts 64 of the contactor 9 completes a holding circuit for the coil 54' which is independent of the contacts 55 of the relay 56' so that the coil 54' is not deenergized when the relay 56' opens its contacts, due to the circuit of the coil 62 being opened at the contacts 63.

The converter is now in operation and supplies current to the distribution circuit 4.

The converter is shut down under normal conditions by opening the switch 20 which deenergizes the coil 21 of the master relay 22. The opening of the contacts 57 of the master relay 22 deenergizes the coil 54' of the contactor 9 so that the converter is disconnected from the distribution circuit 4. The opening of the contacts 31 of the master relay 32 deenergizes the coil 54 of the contactor 7, so that the converter is disconnected from the high voltage taps of the transformer. The closing of the auxiliary contacts 70 on the contactor 7 connects the motor 10 across the control circuit 23 so that the movable brushes 8 are moved out of engagement with the commutator. The limit switch 11' which is in circuit with the motor 10 opens when the brush raising operation is completed so as to stop the motor.

The opening of the contacts 31 of the master relay also deenergizes the coil 50 of the contactor 16 so that the field winding 12 is disconnected from the direct current brushes 8 of the converter and the relay 34 is restored to its normal position after a certain time.

Since the converter is disconnected from alternating current source and the field circuit is open the direct current voltage of the converter decreases below the drop out point of the relay 40 so that it is restored to its normal position after a certain time. The converter is now completely shut down, awaiting the closing of the switch 20.

The shutting down of the converter may also be effected by any one of the protective devices opening its respective contacts 26 or 27 in the circuit of the coil 21 of the master relay 22. The shutting down operation will be the same as above described. In case, however, the abnormal condition which causes the converter to shut down is of a momentary character the shutting down operation is the same as above described except that as soon as the raising operation of the brushes is completed and the voltage relay 40 closes its contacts 25, the master relay 22 is again energized and the heretofore described starting operation is repeated. The time required for the brush raising mechanism to complete its brush raising operation, after the contactor 7 opens, is long enough so that all of the other control devices have returned to their normal positions when the contacts 60 are closed. In automatic control equipments for synchronous converters which are not provided with a brush raising mechanism, the relay 40 may be so designed that it does not drop out until after all of the other devices have had time to return to their normal positions. Thereby the proper starting sequence of operation is insured.

While I have shown and described only one embodiment of my invention. I do not desire to be limited thereto, but seek to cover in the appended claims all those modifications that fall within the true spirit and scope of my invention.

What I claim as new and desire to secure by Letters Patent of the United States, is:

1. In combination, an alternating current source, a synchronous converter, switching means whereby said converter may be connected to said source, a source of direct current, means whereby the field winding of said converter may be connected to said source of direct current, and means arranged to be operated by the current supplied to the field winding by said source of direct current to effect the connection of the field winding to the direct current brushes of said converter.

2. In combination, an alternating current source, a synchronous converter, switching means whereby said converter may be connected to said source, a source of direct current, means connected and arranged so that it operates in accordance with the speed of said converter to effect the connection of the field winding of the converter to said source of direct current, and means arranged to be operated by the current supplied to said field winding by said source of direct current to effect the connection of said field winding to the direct current brushes of said converter.

3. In combination, an alternating current source, a synchronous converter, switching means whereby said converter may be connected to said source, a source of direct current, means connected and arranged so that it operates in accordance with the slip of said converter to effect the connection of the field winding of said converter to said source of direct current, and means arranged to be operated when the direct current supplied to the field winding of said converter from said source of direct current builds up to a predetermined value for effecting the connection of the field winding to the direct current brushes of the converter.

4. In combination, an alternating current source, a synchronous converter, switching means whereby said converter may be connected to said source, a source of direct current, means operative in response to the voltage across the direct current terminals of said converter to effect the connection of the field winding of said converter to said source of direct current, and means arranged to be operated by the current supplied to said field winding from said source of direct current to effect the connection of said field winding to the direct current terminals of said converter.

5. In combination, an alternating current source, a synchronous converter, switching means whereby said converter may be connected to said source, a source of direct current, a relay connected across the direct current brushes of said converter and arranged to be operated only in response to a predetermined value of unidirectional current for effecting the connection of the field winding of said converter to said source of direct current, and means arranged to be operated by the current supplied to said field winding from said source of direct current for effecting the connection of the field winding to the direct current brushes of said converter.

6. In combination, an alternating current source, a synchronous converter, switching means whereby said converter may be connected to said source, a source of direct current, a hesitating control relay connected across the direct current brushes of said converter for effecting the connection of the field winding of said converter to said source of direct current, and means arranged to be operated when the current supplied to the field winding of the converter from said source of direct current builds up to a predetermined value for effecting the connection of the field winding of said converter to the direct current brushes of the converter.

7. In combination, an alternating current source, a synchronous converter, switching means arranged to connect said converter to said source so that a low voltage may be impressed upon said converter, switching means arranged to connect said converter to said source so that a high voltage may be impressed upon said converter, a source of direct current, means operative to effect the operation of said first mentioned switching means, means whereby the field winding of said converter may be connected to said source of direct current, means operative in response to the current supplied to said field winding from said source of direct current to effect the connection of said field winding to the direct current brushes of said converter, and means whereby the operation of said second mentioned switching means may be effected after the field winding is connected to the direct current brushes of the converter.

8. In combination, an alternating current source, a synchronous converter, switching means arranged to connect said converter to said source so that a low voltage is impressed upon said converter, switching means arranged to connect said converter to said source so that a high voltage is impressed upon said converter, a source of direct current, means operative to effect the operation of said first mentioned switching means, means whereby the field winding of said converter may be connected to said source of direct current, means operative in response to the current supplied to said field winding from said source of direct current to effect the connection of said field winding to the direct current brushes of said converter, and means operative in response to the current supplied to said field winding from the direct current brushes to effect the operation of said second mentioned switching means.

9. In combination, an alternating current source, a synchronous converter, switching means arranged to connect said converter to said source so that a low voltage is impressed upon said converter, switching means arranged to connect said converter to said source so that a high voltage is impressed upon said converter, a source of direct current, means operative to effect the operation of said first mentioned means, means connected and arranged so that its operation depends upon the slip of said converter to effect the connection of the field winding of said converter, to said source of direct current, means operative in response to the current supplied to said field winding from said source of direct current to effect the connection of the field winding of said converter to the direct current brushes of said converter, and means operative in response to the current supplied to said field winding from the direct current brushes to effect the operation of said second mentioned switching means.

10. In combination, an alternating current source, a synchronous converter, switching means arranged to connect the alternating current terminals of said converter to said source so that a low voltage is impressed upon said terminals, switching means arranged to connect the alternating current terminals of said converter to said source so that a high voltage is impressed upon said terminals, a source of direct current, means operative to effect the operation of said first mentioned switching means, means whereby the field winding of said converter may be connected to said source of direct current, means whereby the field winding of said converter may be connected to the direct current terminals of said converter after the field winding has been connected to said source of direct current, and means operative in response to the current supplied to said field winding from said direct current terminals to effect the operation of said second mentioned switching means.

11. In combination, an alternating current source, a synchronous converter, switching means arranged to connect said converter to said source so that a low voltage may be impressed upon said converter, switching means arranged to connect said converter to said source so that a high voltage may be impressed upon said converter, a source of direct current, means operative to effect the operation of said first mentioned switching means, means connected and arranged so that its operation depends upon the slip of said converter to effect the connection of the field winding of said converter to said source of direct current, means whereby the field winding of said converter may be connected to the direct current brushes of said converter after the field winding has been connected to said direct current source and means operative in response to the current supplied to said field winding from the direct current brushes to effect the operation of said second mentioned switching means.

12. In combination, an alternating current source, a synchronous converter, switching means whereby said converter may be connected to said source, a source of direct current, means whereby the field winding of said converter may be connected to said source of direct current, and a relay connected in series with the circuit comprising said source of direct current and the field winding of said converter and arranged so that it operates to effect the connection of the field winding of said converter to the direct current brushes of said converter when the current in said circuit builds up to a predetermined steady value.

13. In combination, an alternating current source, a synchronous converter, switching means whereby said converter may be connected to said source, a source of direct current, a hesitating control relay connected across the direct current brushes of said converter and arranged to effect the connection of the field winding of said converter to said source of direct current, and a relay connected in series with the circuit comprising said source of direct current and the field winding of said converter and arranged to effect the connection of the field winding of said converter to the direct current brushes of said converter when the current in said circuit builds up to a predetermined steady value.

14. In combination, an alternating current source, a synchronous converter, switching means arranged to connect said converter to said source so that a low voltage may be impressed upon said converter, switching means arranged to connect said converter to said source so that a high voltage may be impressed upon said converter, a source of direct current, a relay connected across the direct current brushes of said converter and arranged to effect the connection of the field winding of said converter to said source of direct current, when the voltage across the direct current brushes attains a unidirectional state, a relay connected in series with the circuit comprising said source of direct current and the field winding of said converter and arranged to effect the connection of the field winding of said converter to the direct current brushes of said converter when the current in said circuit builds up to a predetermined steady value, and a relay connected in series with the circuit comprising the field winding of said converter and the direct current brushes of said converter and arranged to effect the operation of said second mentioned switching means when the shunt field current builds up to a predetermined steady value.

15. In combination, an alternating current source, a synchronous converter, switching means arranged to connect said converter to said source so that a low voltage may be impressed upon said converter, switching means arranged to connect said converter to said source so that a high voltage may be impressed upon said converter, a source of direct current, a hesitating control relay connected across the direct current brushes of said converter and arranged to effect the connection of the field winding of said converter to said source of direct current when the voltage across the direct current brushes attains a unidirectional state, a hesitating control relay connected in series with the circuit comprising said source of direct current and the field winding of said converter and arranged to effect the connection of the field winding of said converter to the direct current brushes of said converter when the current in said circuit builds up to a predetermined steady value, and a hesitating control relay connected in series with the circuit comprising the field winding of said converter and the direct current brushes of said converter and arranged to effect the operation of said second mentioned switching means when the shunt field current builds up to a predetermined steady value.

16. In combination, a source of alternating current, a synchronous converter, switching means arranged to connect said converter to said source so that a low voltage may be impressed on said converter, a second switching means arranged to connect said converter to said source so that a high voltage may be impressed on said converter, a source of direct current, an electromagnet arranged when energized to effect the operation of said first mentioned switching means, an energizing circuit for said electromagnet, an electromagnetically operated means arranged to connect said source of direct current to the field winding of said converter, a circuit for said electromagnetically operated means, means controlled by the voltage across the direct current brushes of said converter for controlling contacts in the circuits of said electromagnet and said electromagnetically operated means, and means whereby the field winding of said converter is connected to the direct current brushes of said converter and the operation of said second switching means is effected after the field winding of said converter is connected to said source of direct current.

17. In combination, a source of alternating current, a synchronous converter, switching means arranged to connect said converter to said source so that a low voltage may be impressed on said converter, a second switching means arranged to connect said converter to said source so that a high voltage may be impressed on said converter, a source of direct current, an electromagnet arranged when energized to effect the operation of said first mentioned switching means, an energizing circuit for said electromagnet, an electromagnetically operated means arranged to connect said source of direct current to the field winding of said converter, a circuit for said electromagnetically operated means, a hesitating control relay connected across the direct current brushes of said converter for controlling contacts in the circuits of said electromagnet and said electromagnetically operated means, contacts in the energizing circuit of said electromagnet connected in parallel with the contacts controlled by said hesitating control relay and arranged to be closed when said electromagnet is energized, and means whereby the field winding of said converter is connected to the direct current brushes of said converter and the operation of said second switching means is effected after the field winding is connected to said source of direct current.

18. In combination, a source of alternating current, a synchronous converter, switching means arranged to connect said converter to said source so that a low voltage may be impressed on said converter, a second switching means arranged to connect said converter to said source so that a high voltage may be impressed on said converter, a source of direct current, an electromagnet arranged when energized to effect the operation of said first mentioned switching means, an energizing circuit for said electromagnet, means whereby certain of the direct current brushes of the converter may be raised and lowered, contacts in said energizing circuit controlled by said last mentioned means whereby said energizing circuit is completed only when the brushes controlled by said last mentioned means are raised, means whereby the field winding of said converter is connected to said source of direct current when the speed of the converter reaches a predetermined value, means whereby the field winding of said converter is connected to the direct current brushes of said converter and the operation of said second switching means is effected after the field winding is connected to said source of direct current, and means controlled by said second switching means for effecting the operation of said brush raising and lowering means.

19. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a direct current generator, driving means for said generator, means adapted when operated to effect the operation of said first mentioned switching means and the operation of said driving means, means connected and arranged so that its operation depends upon the speed of said converter to effect the connection of the field winding of said converter to said generator, means whereby the field winding of said converter is self-excited and said second switching means is operated after the polarity of said converter is correct, and means controlled by said first mentioned switching means for rendering said driving means inoperative.

20. In combination, a source of alternating current, a synchronous converter, switching means whereby said converter may be connected to said source so that a low voltage may be impressed upon said converter, switching means whereby said converter may be connected to said source so that a high voltage may be impressed upon said converter, means responsive to the voltage across the direct current terminals of said converter for applying the excitation of said converter, and means responsive to the field current of said converter for effecting the operation of said second mentioned switching means.

21. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a hesitating control relay connected across the direct current terminals of said converter for applying the excitation of said converter, and a hesitating control relay responsive to the field current of said converter for effecting the operation of said second mentioned switching means.

22. In combination, a source of alternating current, a synchronous converter, switching means whereby said converter may be connected to said source so that a low voltage may be impressed upon said converter, switching means whereby said converter may be connected to said source so that a high voltage may be impressed upon said converter, means whereby the field winding of said converter may be connected across the direct current brushes of said converter, and a hesitating control relay connected in series with the circuit comprising the field winding of said converter and the direct current brushes of said converter for effecting the operation of said second mentioned switching means.

23. In combination, a source of alternating current, a synchronous converter, switching means whereby said converter may be connected to said source so that a low voltage may be impressed upon said converter, switching means whereby said converter may be connected to said source so that a high voltage may be impressed upon said converter, means whereby the field winding of said converter may be connected to the direct current brushes of said converter whereby said converter is self-excited, and means responsive to a predetermined value of shunt field current for effecting the operation of said second mentioned switching means.

24. In combination, a source of alternating current, a synchronous converter, automatic switching means adapted to control the connection between said source and said converter and the excitation of said converter, said means comprising a control relay which is arranged to be energized at a predetermined point in the sequence of operation of said switching means to effect further operation of said switching means, a master relay arranged when energized to effect the operation of said switching means to connect said converter to said source and to control the excitation of said converter so that a predetermined polarity is obtained across the direct current brushes of the converter and when deenergized to effect the disconnection of said converter from said source and the deenergization of said control relay, and means controlled by said control relay for controlling said master relay so that it can be reenergized only after said control relay has been deenergized for a predetermined time.

25. In combination, a source of alternating current, a synchronous converter, automatic switching means comprising a plurality of devices including a relay responsive to the direct current voltage of the converter adapted to control the connection between said source and said converter and to control the excitation of said converter, a master relay arranged when energized to effect the operation of said automatic switching means to connect said converter to said source and to cause a direct current voltage having a predetermined polarity to be developed across the direct current brushes of the converter and when deenergized to effect the disconnection of said converter from said source and the deenergization of said voltage relay, an energizing circuit for said master relay, and contacts in said circuit controlled by said voltage relay so that said master relay can be reenergized only after said voltage relay has been deenergized for a predetermined time.

26. In combination, a source of alternating current, a synchronous converter having a field winding, automatic switching means comprising a plurality of devices including a relay responsive to the voltage across the direct current brushes of the converter adapted to control the connection between said source and said converter and to control the excitation of said field winding, a master relay arranged when energized to effect the operation of said automatic switching means to connect said converter to said source and to control the excitation of said field winding so that a predetermined polarity is obtained across the direct current brushes and when deenergized to effect the disconnection of said converter from said source and the deenergization of said field winding, an energizing circiut for said master relay, and contacts in said energizing circuit controlled by said voltage relay so that said master relay can be reenergized only after said voltage relay has been deenergized for a predetermined length of time.

27. In combination, a source of alternating current, a synchronous converter, automatic switching means for controlling the connection of said converter to said source, said means comprising brush raising mechanism, a master relay, which when energized effects the operation of said automatic switching means to connect said converter to said source, and when deenergized effects the disconnection of said converter from said source, an energizing circuit for said master relay, and contacts in said energizing circuit controlled by said brush raising mechanism whereby said master relay can be energized to effect the starting of said converter only when the converter brushes are raised.

28. In combination, a source of alternating current, a synchronous converter, automatic switching means for controlling the starting of said converter, said means comprising brush raising mechanism, a control relay, arranged when energized to effect the operation of said automatic switching means to start said converter, an energizing circuit for said control relay, contacts in said energizing circuit controlled by said brush raising mechanism whereby said control relay can be energized to effect the starting of said converter only when the converter brushes are raised, and means responsive to the energization of said control relay for completing a circuit for said control relay independently of said contacts.

29. In combination, a synchronous converter, a source of alternating current, means for connecting said converter to said source so as to impress a relatively low starting voltage on said converter, means for connecting said converter to said source so as to impress normal operating voltage on said converter, a motor generator set for supplying current to the field winding of said converter, and means controlled by said first mentioned switching means for controlling the starting and stopping of said motor generator set.

30. In combination, a synchronous converter, a source of alternating current, means for connecting said converter to said source so as to impress a relatively low starting voltage on said converter, means for connecting said converter to said source so as to impress normal operating voltage on said converter, a motor driven exciter, a circuit for the motor of said motor driven exciter controlled by said first mentioned switching means so that said circuit is completed when said first mentioned switching means is closed and said circuit is opened when said first mentioned switching means is open, speed responsive means for connecting said exciter to the field winding of said converter, and means controlled by predetermined conditions of said converter for effecting the disconnection of the field winding from the exciter and the connection of the field winding to the direct current brushes of the converter and for effecting the subsequent opening of said first mentioned switching means and the closing of the second mentioned switching means.

In witness whereof, I have hereunto set my hand this 16th day of November, 1922.

MAX A. WHITING.